United States Patent
Klein et al.

(10) Patent No.: US 11,327,874 B1
(45) Date of Patent: May 10, 2022

(54) SYSTEM, METHOD, AND COMPUTER PROGRAM FOR ORCHESTRATING AUTOMATIC SOFTWARE TESTING

(71) Applicant: Amdocs Development Limited, Limassol (CY)

(72) Inventors: Yasmin Bel Klein, Beit Kama (IL); Yossi Bitton, Petach Tiqwa (IL); Itsik David, Modiin (IL); Dror Avrilingi, Modiin (IL); Ighal Szyk, Kefar Saba (IL)

(73) Assignee: AMDOCS DEVELOPMENT LIMITED, Limassol (CY)

(*) Notice: Subject to any disclaimer, the term of this patent is extended or adjusted under 35 U.S.C. 154(b) by 0 days.

(21) Appl. No.: 16/540,742

(22) Filed: Aug. 14, 2019

(51) Int. Cl.
  *G06F 9/44* (2018.01)
  *G06F 11/36* (2006.01)

(52) U.S. Cl.
  CPC ...... *G06F 11/3684* (2013.01); *G06F 11/3664* (2013.01); *G06F 11/3688* (2013.01); *G06F 11/3692* (2013.01)

(58) Field of Classification Search
  CPC .......... G06F 11/3684; G06F 11/3664; G06F 11/3688; G06F 11/3692
  See application file for complete search history.

(56) References Cited

U.S. PATENT DOCUMENTS

| | | | |
|---|---|---|---|
| 9,501,389 B1* | 11/2016 | Bhuiya | G06F 11/3684 |
| 9,710,367 B1* | 7/2017 | Nagineni | G06F 11/3684 |
| 2004/0154001 A1 | 8/2004 | Haghighat et al. | |
| 2007/0038977 A1* | 2/2007 | Savage | G06F 8/20 717/106 |
| 2008/0082968 A1* | 4/2008 | Chang | G06F 11/3688 717/124 |
| 2008/0244524 A1 | 10/2008 | Kelso | |
| 2010/0180260 A1 | 7/2010 | Chikkadevaiah et al. | |
| 2015/0007149 A1* | 1/2015 | Maddela | G06F 11/3696 717/131 |
| 2015/0082287 A1* | 3/2015 | Augustine | G06F 11/3688 717/131 |
| 2015/0135164 A1 | 5/2015 | Bright et al. | |
| 2016/0210225 A1* | 7/2016 | Champlin-Scharff | G06F 11/3684 |
| 2018/0329808 A1* | 11/2018 | Friedenberg | G06F 11/3608 |
| 2020/0104246 A1* | 4/2020 | Bhatt | G06F 11/3692 |

FOREIGN PATENT DOCUMENTS

GB  2516986 A  2/2015

* cited by examiner

*Primary Examiner* — Hang Pan
(74) *Attorney, Agent, or Firm* — Zilka-Kotab, P.C.

(57) ABSTRACT

As described herein, a system, method, and computer program are provided for orchestrating automatic software testing. In use, an interface to a plurality of different testing tools is provided, where each testing tool of the plurality of different testing tools usable for performing one or more testing-related tasks. Additionally, information describing a software project is identified. Further, use of the plurality of different testing tools is orchestrated to provide automated testing for the software project.

13 Claims, 14 Drawing Sheets

SYSTEM, METHOD, AND COMPUTER PROGRAM FOR ORCHESTRATING AUTOMATIC SOFTWARE TESTING

FIELD OF THE INVENTION

The present invention relates to testing software.

BACKGROUND

Typically, software is tested before being made available to users, system, etc. to provide quality assurance. However, software testing generally requires manual design of tests specific to the software, and oftentimes even manual execution of various portions of those tests. For example, a testing cycle for software may include manual tasks such as searching for or otherwise determining software features, searching for or otherwise determining existing testing scripts for the software features and/or creating new testing scripts, creating and executing a process that runs the testing scripts, analyzing results of the process, opening defects following a root cause analysis, and possibly other tasks. The manual requirements related to testing software can introduce delays in making software available to users, inconsistencies in how thoroughly software is tested, among other limitations.

Moreover, the testing cycle for software may involve use of multiple different testing tools, with each testing tool used for a different task. This complicates any testing software flow by segmenting the various tasks and relying on manual correlations between inputs and outputs of the various tools, thus preventing a streamlined testing cycle.

There is thus a need for addressing these and/or other issues associated with the prior art.

SUMMARY

As described herein, a system, method, and computer program are provided for orchestrating automatic software testing. In use, an interface to a plurality of different testing tools is provided, where each testing tool of the plurality of different testing tools usable for performing one or more testing-related tasks. Additionally, information describing a software project is identified. Further, use of the plurality of different testing tools is orchestrated to provide automated testing for the software project.

DETAILED DESCRIPTION

Figure 1:
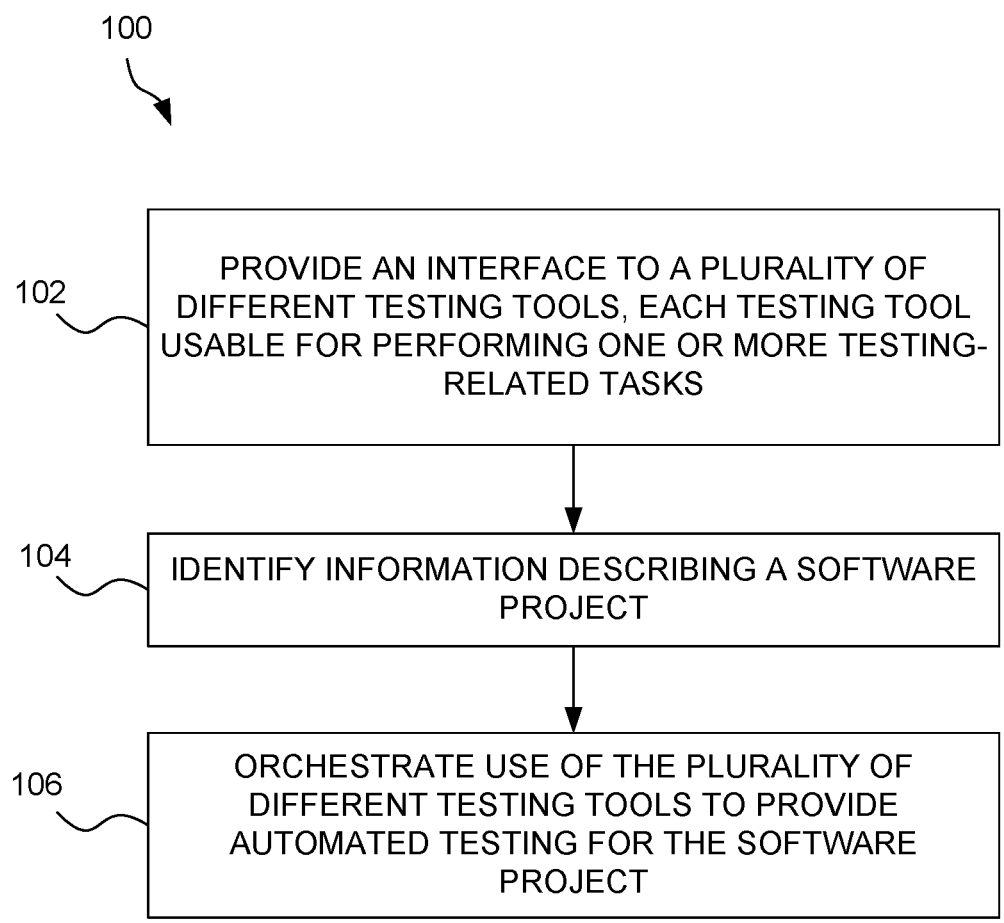
FIG. 1 illustrates a flow diagram of a method for orchestrating automatic software testing, in accordance with one embodiment.

FIG. 1 illustrates a flow diagram of a method 100 for orchestrating automatic software testing, in accordance with one embodiment. In one embodiment, the method 100 may be performed by an orchestration platform, as described in more detail below, which automates design and execution of testing of a software project.

As shown in operation 102, an interface to a plurality of different testing tools is provided, where each testing tool is usable for performing one or more testing-related tasks. In one embodiment, the interface may be a component of an orchestration platform (i.e. system) comprised of one or more servers or other computing devices. The orchestration platform may be independent of the testing tools. For example, the orchestration platform may be provided by a third-party to entities (e.g. companies, developers, etc.) providing the testing tools. Further, the entities providing the testing tools may also be different from one another. In other words, the testing tools may be independently managed on different platforms from each other and from the orchestration platform.

The interface may include application programming interfaces (APIs) to communicate with the different testing tools (e.g. over one or more networks). Thus, the interface may allow the orchestration platform to send communications to the testing tools and receive communications from the testing tools. For example, the orchestration platform may cause the testing tools to perform certain testing-related tasks, and may receive results of the testing-related tasks from the testing tools, all via the interface.

The orchestration platform may also include functions, applications, etc. for performing one or more testing-related tasks. The testing-related tasks performed by the testing tools and/or orchestration platform may include tasks for designing and/or executing one or more tests for a software project. The software project may be comprised of computer code for functions, processes, user interfaces, and/or any other components of a software application that may be tested via the orchestration platform.

In various exemplary embodiments, the testing-related tasks may include detecting features of a software project to be tested, determining existing test scripts for testing one or more of the features, generating new test scripts for testing one or more of the features, executing the test scripts to test the features, analyzing results of the test script executions, detecting defects in the software project, etc.

Additionally, as shown in operation 104, information describing a software project is identified. The information may be identified from any source capable of describing the software project. For example, the source may be one or more files storing the information describing the software project.

In one embodiment, the information may be identified by being retrieved from, or otherwise provided by (e.g. via the interface), one or more of the testing tools mentioned above that are capable of being used to generate, or store, the information describing the software project. Just by way of example, the testing tool(s) from which the information may be identified may include Jira®, Rally Software®, and/or Application Lifecycle Management (ALM) software.

Moreover, the information may be any type, format, etc. of information that describes the software project. In various exemplary embodiments, the information may include business requirements, features, user stories, diagrams, worksheets (e.g. Microsoft® Excel™ worksheet), text (e.g. describing functionality of the software project), etc.

Further, in operation 106, use of the plurality of different testing tools is orchestrated to provide automated testing for the software project. The automated testing may include automated design and execution of tests for the software project. For example, the orchestration platform may automatically generate and manage a process flow that automates the testing for the software project, where the process flow utilizes the plurality of different testing tools to perform any of the various testing-related tasks.

To this end, the method 100 may be implemented to automate the design and execution process for testing the software project, via the user of the different testing tools. The method 100 may reduce, or even eliminate, manual work otherwise required for testing software projects, including the manual coordination of tasks performed across the various testing tools.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
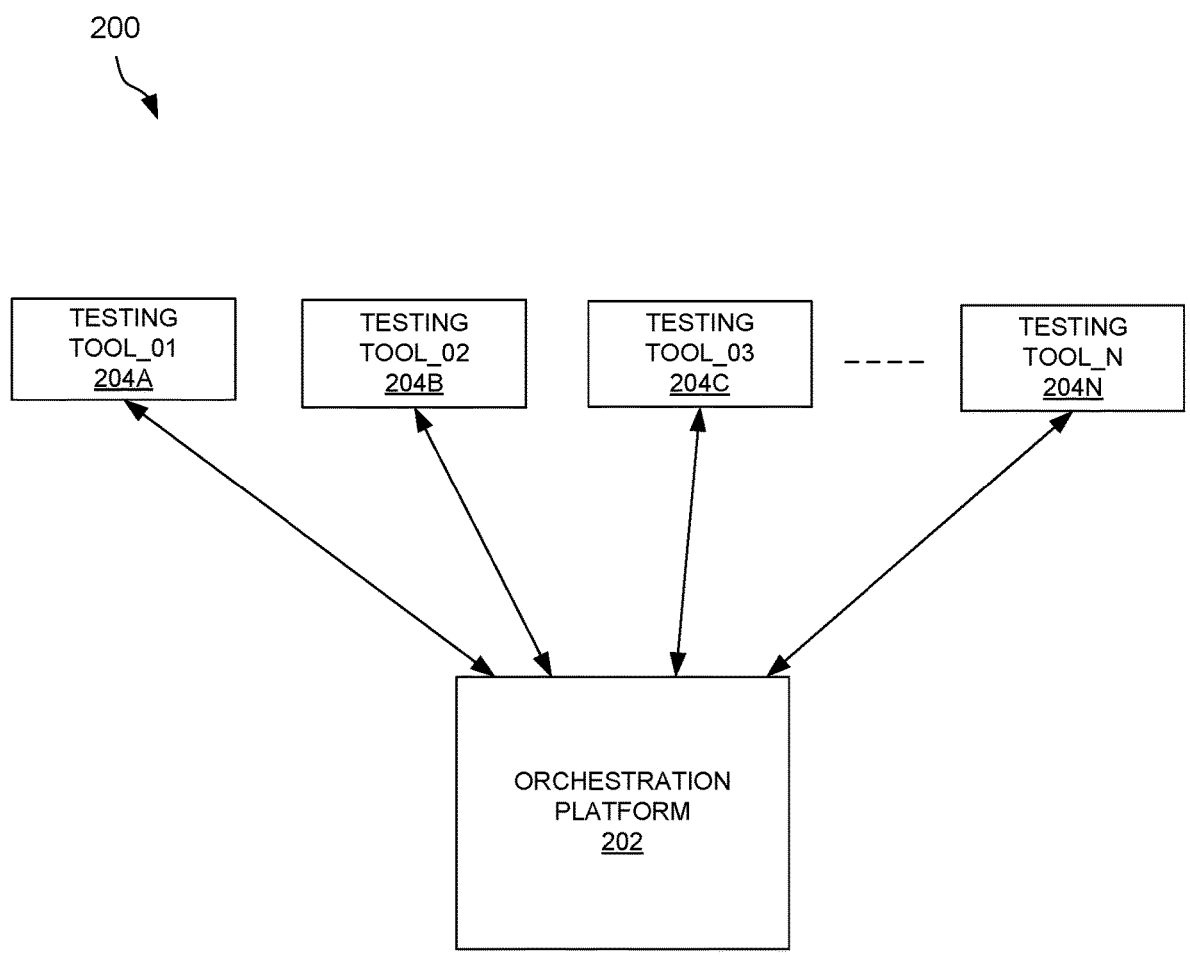
FIG. 2 illustrates a block diagram of a system for orchestrating automatic software testing, in accordance with one embodiment.

FIG. 2 illustrates a block diagram of a system 200 for orchestrating automatic software testing, in accordance with one embodiment. Thus, the system 200 may be implemented to carry out the method 100 of FIG. 1. It should be noted that the definitions and descriptions provided above may equally apply to the present embodiment.

As shown, an orchestration platform 202 interfaces a plurality of different testing tools 204A-N. The orchestration platform 202 includes hardware (e.g. servers, etc.) and software (e.g. functions, user interfaces, etc.) capable of being used for orchestrating automatic software testing. In particular, the orchestration platform 202 automates the design and execution process for testing a software project.

The orchestration platform 202 interfaces the plurality of different testing tools 204A-N to utilize the testing tools to perform various testing-related tasks. In particular, the orchestration platform 202 includes an interface to the testing tools 204A-N to communicate with the testing tools 204A-N. Through this interface, the orchestration platform 202 can cause the testing tools 204A-N to perform the testing-related tasks and can receive results of the testing-related tasks from the testing tools 204A-N.

The orchestration platform 202 may provide user interfaces for allowing a user to define settings and configurations, allowing a user to define a scope of testing, and allowing a user to define a testing execution mode. The testing execution mode may include executing testing responsive to user input, in a batch mode, or on-demand.

Figure 3:
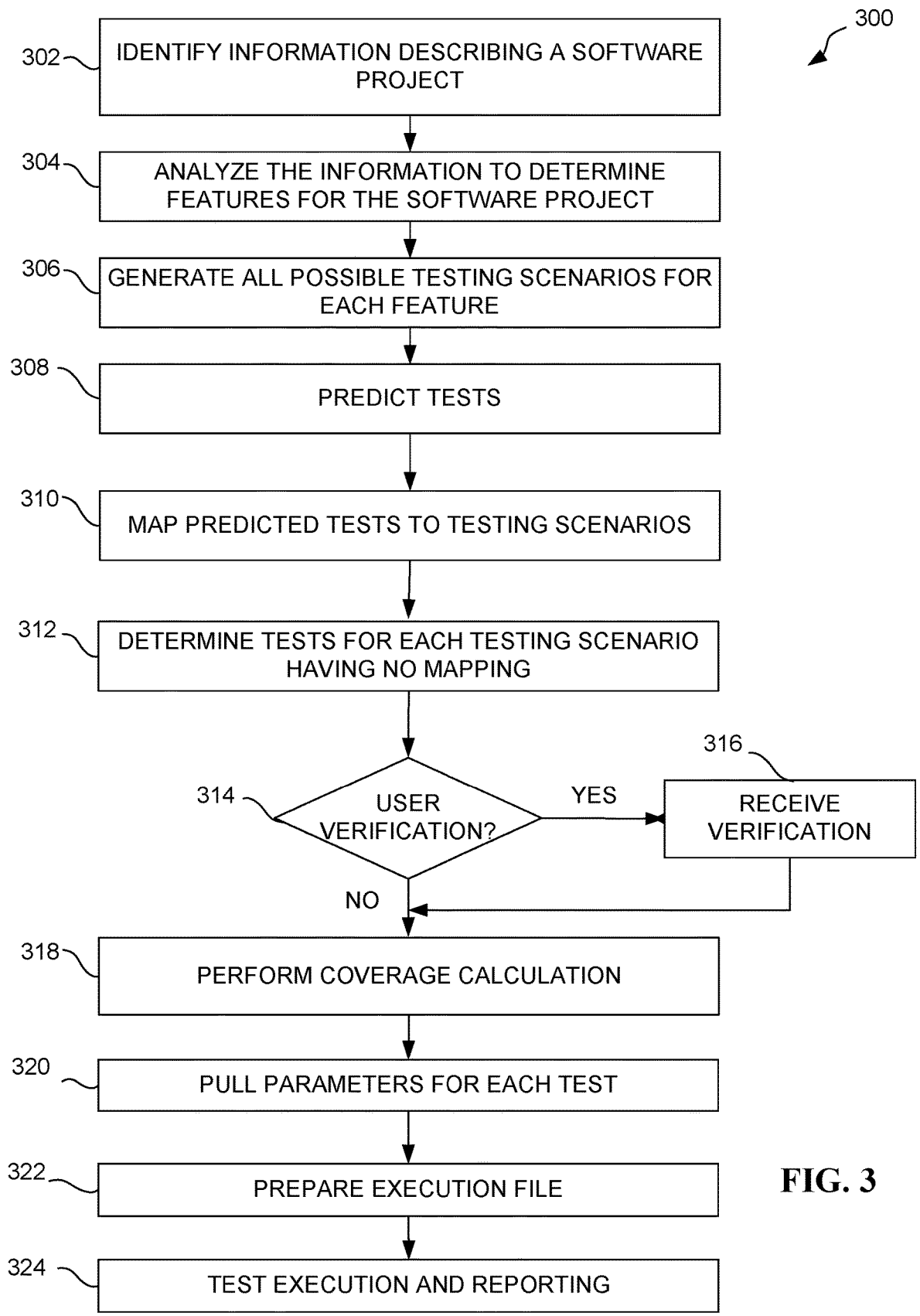
FIG. 3 shows a flow diagram of a method for orchestrating automatic software testing, in accordance with one embodiment.

FIG. 3 shows a flow diagram of a method 300 for orchestrating automatic software testing, in accordance with one embodiment. The method 300 may be implemented by the orchestration platform 202 of FIG. 2. For example, the orchestration platform 202 may cause the testing tools 204A-N to perform any of the operations of the method 300. It should be noted that the definitions and descriptions provided above may equally apply to the present embodiment.

As shown in operation 302, information describing a software project is identified. The information may be identified from one or more files. The files may be sourced from one or more testing tools.

In operation 304, the information is analyzed to determine features for the software project. In one embodiment, natural language processing can be used to process and analyze (e.g. tokenize) the information, which may include business requirements, features, user stories, diagrams, a worksheet, text (e.g. including described functionality), etc. The features that are determined may be specific functionality of the software project. In operation 306, all possible testing scenarios are generated for each feature.

Then, in operation 308, tests are predicted for each testing scenario. In the present description, the tests refer to scripts executable to test features of the software project. The tests may be scripts for regression and progression testing, and may be manual or automatic tests. In one embodiment, the tests may be predicted using a machine learning algorithm (described in more detail below).

In operation 310, the tests are mapped to the testing scenarios. In one embodiment, functionality of the tests may be determined by pulling tokens from the scripts, existing tests may be mapped to the testing scenarios based on the functionality of the tests (described in more detail below).

In operation 312, tests are determined for each testing scenario having no mapping from operation 310. For example, a testing scenario may have no mapping from operation 310 when an existing test for the testing scenario is not found. New tests for these testing scenarios may be determined by generating the same from existing individual test steps that can be combined to form a new test (described in more detail below).

In connection with operations 310 and 312, the method 300 may further use various testing tools for planning (e.g. ALM, Jira®, Rally Software®), execution source controls (e.g. Bitbucket™, Tricentis Tosca®, GIT®, Apache Subversion® (SVN)), and orchestration tools (e.g. Jenkins™ software, Bamboo® software, Tricentis Tosca®).

Next, in decision 314, it is determined whether user verification is desired. For example, decision 314 may include determining whether a user has selected an option to verify accuracy and increase coverage of the tests identified in operations 310 and 312. When it is determined in decision 314 that user verification is desired, user verification is received in operation 316 before proceeding to operation 318.

Otherwise, when it is determined in decision 314 that user verification is not desired, the method 300 proceeds from decision 314 to operation 318 in which a coverage calculation is performed. The coverage calculation may determine how much of the software project is covered (i.e. tested) via the tests identified in operations 310 and 312.

For example, for each of the features, the coverage calculation may indicate:

A) the total number of (and which) testing scenarios that were generated in operation 306;

B) a number of (and which) of the generated testing scenarios have more than two (2) scripts mapped to them; and C) a ratio of B/C.

The coverage for a single feature may be calculated and/or the coverage for a particular deployment date (date of deployment of the software project) which may contain more than one (1) feature.

Further, in operation 320, parameters for each test are pulled. The parameters may be values used during execution of the corresponding test. In one embodiment, the parameters may be pulled (e.g. retrieved, identified, etc.) from a testing tool (e.g. Test Data Management (TDM) system).

As execution of test scripts involves the injection of accurate test data (i.e. parameters) into the environment, the set of data parameters required for each one of the testing scenarios may be sent to the TDM system. The TDM system will get the required data parameters and in return will send the data once ready, to be executed through the test script. The data may be inserted into the correct places in the testing scenarios during the test script execution. By the end of this operation, for each feature of the software project, there will be a set of test scripts to be executed using the corresponding test data.

In operation 322, an execution file is prepared. The execution file will manage the following dependencies:

1. Manual test script depended on manual test script.

2. Automated test script depended on automated test script. In one embodiment, this may include a dependency between two 2-N separate test scripts for a single testing tool. For example, when two (2) test scripts should run in sequence and each should run as standalone, but there is no need to pass parameters from one test script to the other in order to continue the test. As another example, when two (2) test scripts should run in sequence, but for the latter to run there is a need to pass parameters from the first test script. As yet another example, when the test scripts should run in parallel.

In another embodiment, this may include a dependency between two 2-N separate test scripts provided by 2-N different testing tools. For example, when the test scripts should run in sequence, but for the latter to run there is a need to pass parameters from the first test script to the other testing tool providing the latter test script. As another example, when the test scripts should run in sequence, but each can run as standalone and there is no need to pass parameters. As yet another example, when the test scripts should run in parallel.

3. Manual test script depended on automated test script and vice versa (e.g. in order to proceed with the automatic script, the manual script must have been completed). The tester may be notified and a service level agreement (SLA) may be provided for completion of the test. Escalation may also be provided if the SLA is reached and the entire software project has not been tested.

4. Internal dependency in a test script in case there is a need to move parameters between different methods.

Operation 322 may be integrated with any other orchestrate and/or automation tool for execution. The module performing operation 322 may manage the execution process of operation 324, namely from the starting point where the execution file is ready to the final stage of feeding ALM with the results of the test execution. The module will know when to pause the execution, manage the dependencies between the different testing tools, and manage the responses and the parameter transfer between the test scripts and testing tools. The module may integrate with any planning, execution tools and source control.

In operation 324, the tests are executed and results of the execution are reported. In one embodiment, the tests may be executed by orchestrating various testing tools to execute the tests, and then receiving the results from those testing tools. In another embodiment, the results of the execution may be reported in one or more user interfaces (e.g. dashboards, etc.). In yet another embodiment, the results of the execution may be analyzed and reported to various testing tools (e.g. ALM, Jira®, etc.), along with the design scope and execution scope of the testing for the software project.

Optionally, defects may be opened in a defect management application (e.g. testing tool) for any failed tests, and may include the analysis and scope associated with the test. Further, a log of failures may be captured and similar defects that were created may be analyzed for performing a root cause analysis. As a further option, once a defect status is changed to fixed for a particular feature, the defect may be selected to re-run the same test script(s) associated with the feature.

It some embodiments, different features, acceptance criteria, and use cases (and optionally user stories) can be available for testing in a different timing. Each time, a new entity is ready for test, all available entities will be selected which are available to test and test execution will be performed even if they have already executed and passed. This may be part of regression testing while testing the progression.

Before execution, the deployment date may be rechecked to determine if it has been changed, and the execution list may be updated accordingly. When feeding the result back to ALM, the status of the features may also be checked in Rally®.

Figure 4:
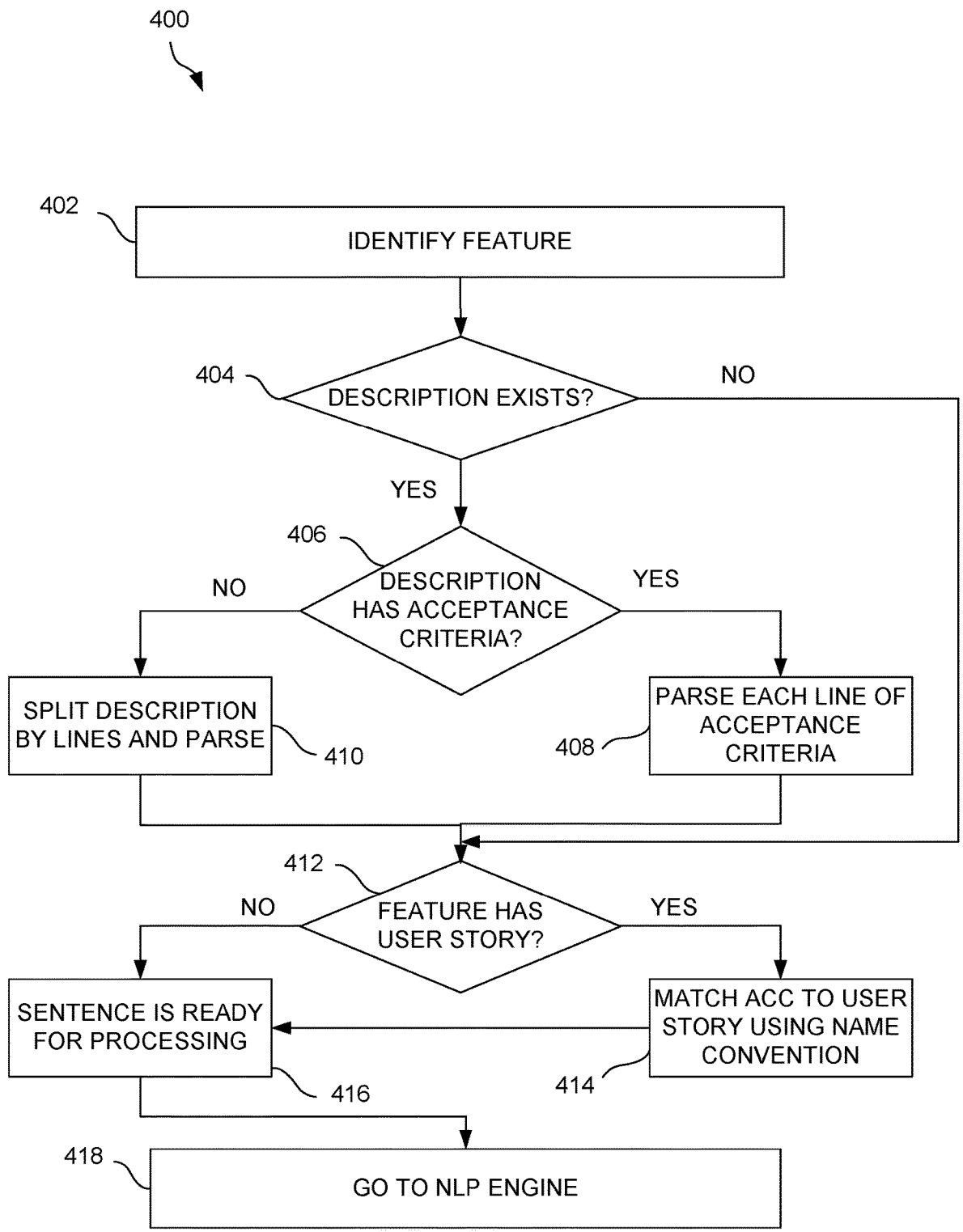
FIG. 4 shows a flow diagram of a method for determining software project features in accordance with operation 304 of FIG. 3.

FIG. 4 shows a flow diagram of a method 400 for determining software project features in accordance with operation 304 of FIG. 3. Of course, it should be noted that the present method 400 is just one example of a method that could carry out operation 304 of FIG. 3 to determine features for the software project.

The present method 400 receives as input free text that is information describing a software project. The method 400 analyzes the free text and the content of the text, and then checks the content to calculate the relevancy of the text. When the relevance of the text is above a predefined threshold, the text is sent to a natural language processing (NLP) engine. The analysis is done in order to avoid sending text to the NLP engine which has a low level of relevancy, to further avoid the future predictions and activities further down the pipeline from being affected and thus from being irrelevant. In cases where the relevance is below a certain threshold a user will be alerted any type of alert may be created with a common suggestion in order to increase the relevancy.

The method 400 operates to use an advanced algorithm to process features, user stories, business requirements, etc. described in software project information obtains from any testing tool used for planning a software project, such as Rally®, Jira®, etc., and to pull the tokens that represent the functionality of those features, user stories, business requirements. The tokens are referred to as features determined for the software project.

In operation 402, a feature (or business requirement, etc.) is identified. The feature may be included in information describing a software project (identified in operation 302 of FIG. 3). Thus, the feature may be mentioned in the information describing the software project. In one embodiment, the feature may be included in information retrieved from a testing tool (e.g. Rally Software®).

In decision 404, it is determined whether a description of the feature exists in the information describing the software project.

When it is determined in decision 404 that a description of the feature exists, the method 400 proceeds to operation 406 in which determines whether the description has acceptance criteria for the software project (i.e. criteria for accepting the software project). When it is determined in decision 406 that the description has acceptance criteria, each line of the acceptance criteria is parsed in operation 408. When it is determined in decision 406 that the description does not have acceptance criteria, the description is split by lines and parsed in operation 410.

Following operation 408 or 410, or a decision in 404 that a description of the feature does not exist, the method 400 proceeds to decision 412 where it is determined whether the feature has a user story. When it is determined in decision 412 that the feature has a user story, acceptance criteria is matched to the user story using a naming convention in operation 414. Following operation 414, or a decision 412 that the feature does not have a story, the method 400 proceeds to operation 416 where the sentence (i.e. the parsed data, etc.) resulting from the above operations is ready for processing and is provided to the NLP engine in operation 418. The NLP engine can pull tokens from the sentence to identify features of the software project.

Figure 5:
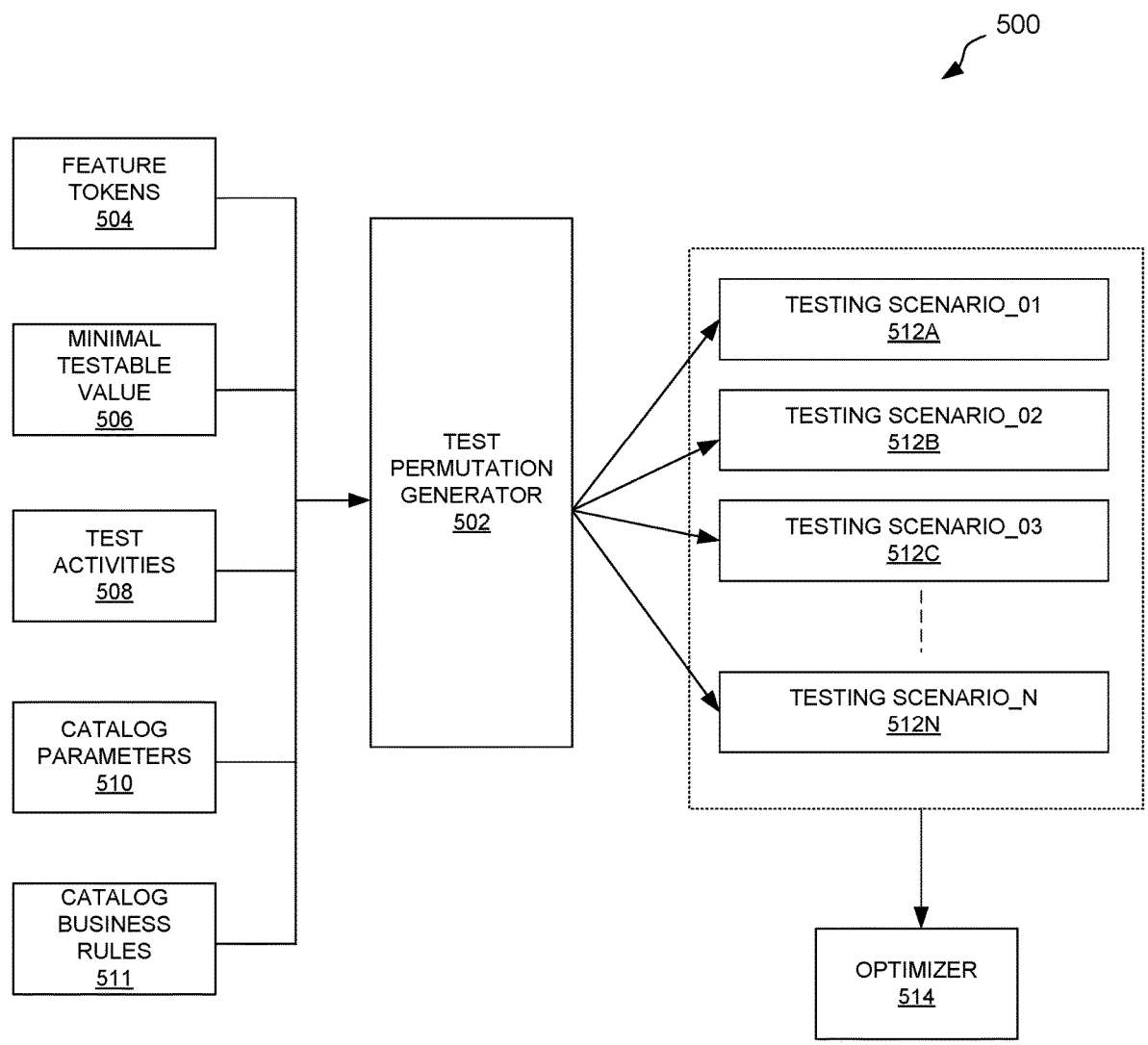
FIG. 5 shows a block diagram of a system for generating testing scenarios in accordance with operation 306 of FIG. 3.

FIG. 5 shows a block diagram of a system 500 for generating testing scenarios in accordance with operation 306 of FIG. 3. Of course, it should be noted that the present system 500 is just one example of a system that could carry out operation 306 of FIG. 3.

As shown, a test permutation generator 502 (e.g. of the orchestration platform) receives multiple inputs 504-511 to generate all possible testing scenarios for each feature determined in operation 304.

In particular, the test permutation generator 502 will use the tokens from the method 400 of FIG. 4 and the testing flow 506 (e.g. Minimal testable flow (MTF)), which will be predefined, to generate a testing scenarios permutation for each feature. The MTF refers to the sequence of activities and interaction between a user and an implementation of the software project.

This will be achieved by using various dictionaries, such as those described below. The tokens are used to understand the business requirement functionality for the software project, and the MTF is used to understand the flow and sequence of actions that the user needs to perform in the implementation of the software project.

The dictionaries include a test step dictionary 508, which can be used to generate a testing scenario step by step to achieve a certain goal automatically. In order to assemble such testing scenario, the test step dictionary 508 it will contain tokens (i.e. a set of words which are frequently used when writing features, acceptance criteria and user stories) and all possible test steps which can be performed for each token/word. The test step dictionary 508 will contain a sunny scenario, rainy scenario and corner cases to achieve maximum testing coverage for each of the functionalities.

The dictionaries further include a catalog of parameters 510. Testing a set of activities and steps will result in X number of tests which do not cover the maximum possibility of scenarios for a single requirement. In order to increase the percentage of coverage, another layer of parameters are provided. For each token/word which has parameters in the catalog 510, a testing permutation will be created for each parameter and combination thereof.

The test permutation generator 502 gathers the inputs 504-511 and generates the permutation of testing scenarios 512A-N. Once all testing scenarios 512A-N are created, an optimizer 514 perform optimization of the testing permutations 512A-N, such as removing duplicate testing scenarios 512A-N.

As shown in operation 308 of FIG. 3, following method 500 of FIG. 5 (or operation 306 of FIG. 3), tests are predicted for the software project. The tests are predicted based on artificial intelligence (e.g. machine learning) that is applied to the features of the software project (e.g. identified in operation 304 of FIG. 3). For example, based on prior trained machine learning models, three (3) sets of testing suites may be predicted, including regression tests (i.e. per testing scenario generated in operation 308), progression tests (e.g. that can be reused for test design), and tests based on defect analysis.

For predicting the regression and progression tests, the following will be performed after pulling the tokens from the information describing the software project:

1. Pull tokens;
2. Split separators in the tokens;
3. Spelling check with the company glossaries—Autocorrect;
4. Expanding terms from Company glossary;
5. Mark tokens which should be ignored due to business reasons/Company terms;
6. Synonym check and replace for most common use in the Company glossary.

With the above performed, a machine learning model is initialized. The data for the model consists of any new requirement which is represented by the tokens above and the category which needs to be predefined. Once a new requirement or any new text is entered to the model, the machine learning model predicts the set of tests for regression and progression to be executed.

Figure 6A:
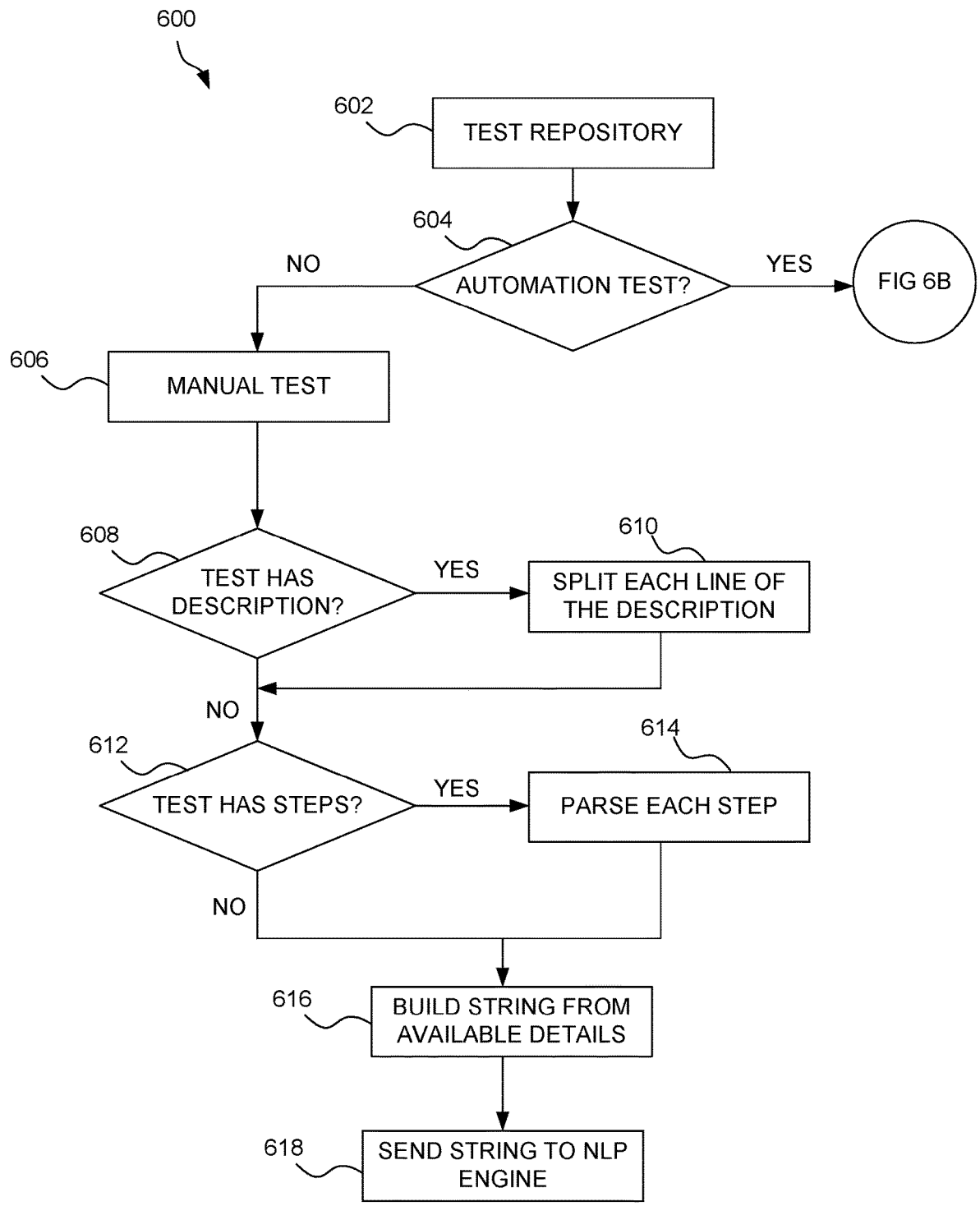
FIGS. 6A-B show a flow diagram of a method for mapping predicted tests to testing scenarios in accordance with operation 310 of FIG. 3.
Figure 6B:
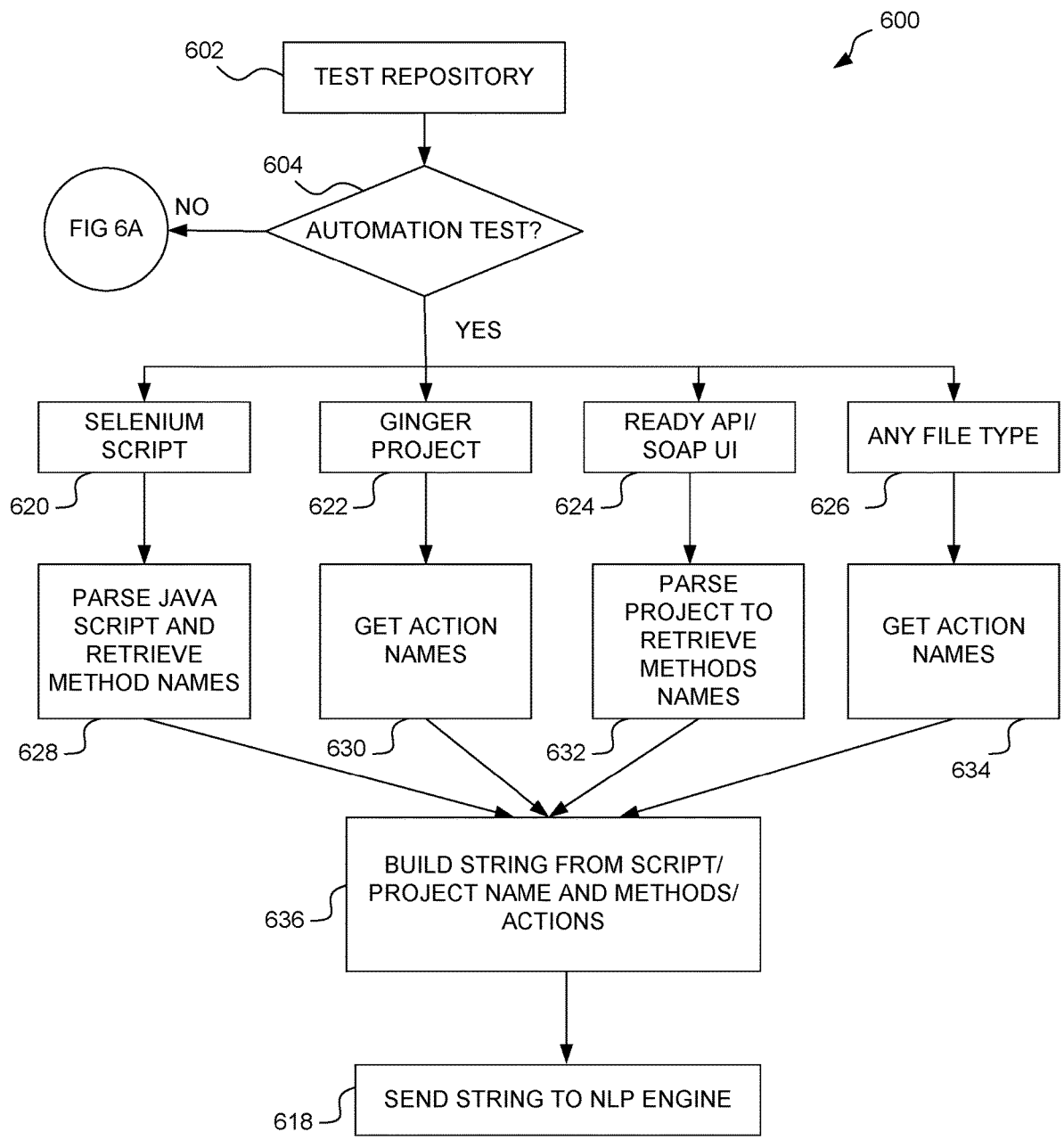

FIGS. 6A-B show a flow diagram of a method 600 for mapping predicted tests to testing scenarios in accordance with operation 310 of FIG. 3. Of course, it should be noted that the present method 600 is just one example of a method that could carry out operation 310 of FIG. 3.

In particular, method 600 prepare strings for various existing manual and automated tests, for use in mapping the predicted tests to testing scenarios. As shown in operation 602, a test repository is accessed. The test repository stores manual and automated tests.

In decision 604, it is determined whether a test in the test repository is automated. Thus, the method 600 may be performed for each test in the test repository. When it is determined in decision 604 that the test in the test repository is not automated, the test is determined to be a manual test in operation 606.

Next, it is determined in decision 608 whether the test has a description. When it is determined in decision 608 that the test has a description, each line of the description is split in operation 610. Following operation 610 or when it is determined in decision 608 that the test does not have a description, it is further determined in decision 612 whether the test has steps. When it is determined in decision 612 that the test has steps, each step is parsed in operation 614. Following operation 614 or when it is determined in decision 612 that the test does not have steps, a string is built from available details in operation 616. For example, the string may be built from the description lines/parsed steps from operations 610 and 614 respectively. The string is then sent to the NLP engine in operation 618.

When it is determined in decision 604 that the test in the test repository is automated, the test is processed based on a type of the test. When the test is identified as a Selenium® script (operation 620), the Java® script is parsed and method names are retrieved in operation 628. When the test is identified as a part of a Ginger project (i.e. a Ginger unit test) in operation 622, action names are obtained in operation 630. When the test is identified as associated with a Ready API or SOAP user interface (UI) (operation 624), the project is parsed to retrieve method names (operation 632). When the test is identified as any other file type (operation 626), action names are obtained (operation 634).

Results of the processing described above is used to build a string from a name of the test as well as the methods and/or actions included in the test, as shown in operation 636. The string generated for the test is then sent to the NLP engine as shown in operation 618.

Figure 7:
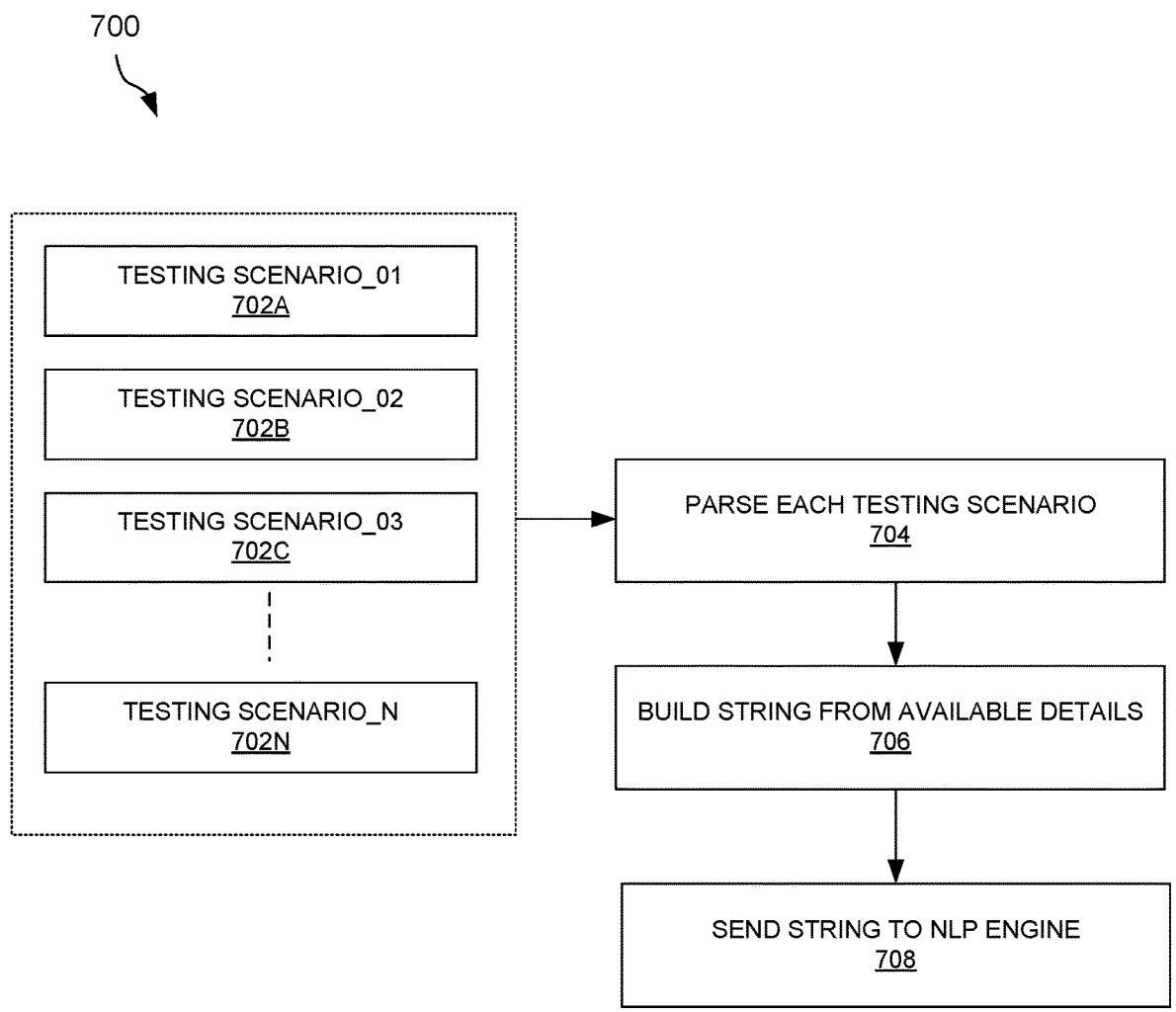
FIG. 7 shows a block diagram of a system for mapping predicted tests to testing scenarios in accordance with operation 310 of FIG. 3.

FIG. 7 shows a block diagram of a system 700 for mapping predicted tests to testing scenarios in accordance with operation 310 of FIG. 3. Of course, it should be noted that the present system 700 is just one example of a system that could carry out operation 310 of FIG. 3.

In particular, system 700 illustrates the preparation of strings for the testing scenarios generated in operation 306 of FIG. 3, for use in mapping the predicted tests to testing scenarios. As shown, each testing scenario 702A-N is parsed (operation 704) and a string is built from available details determined from the parsing (operation 706). The string is then sent to the NLP engine as shown in 708.

Figure 8:
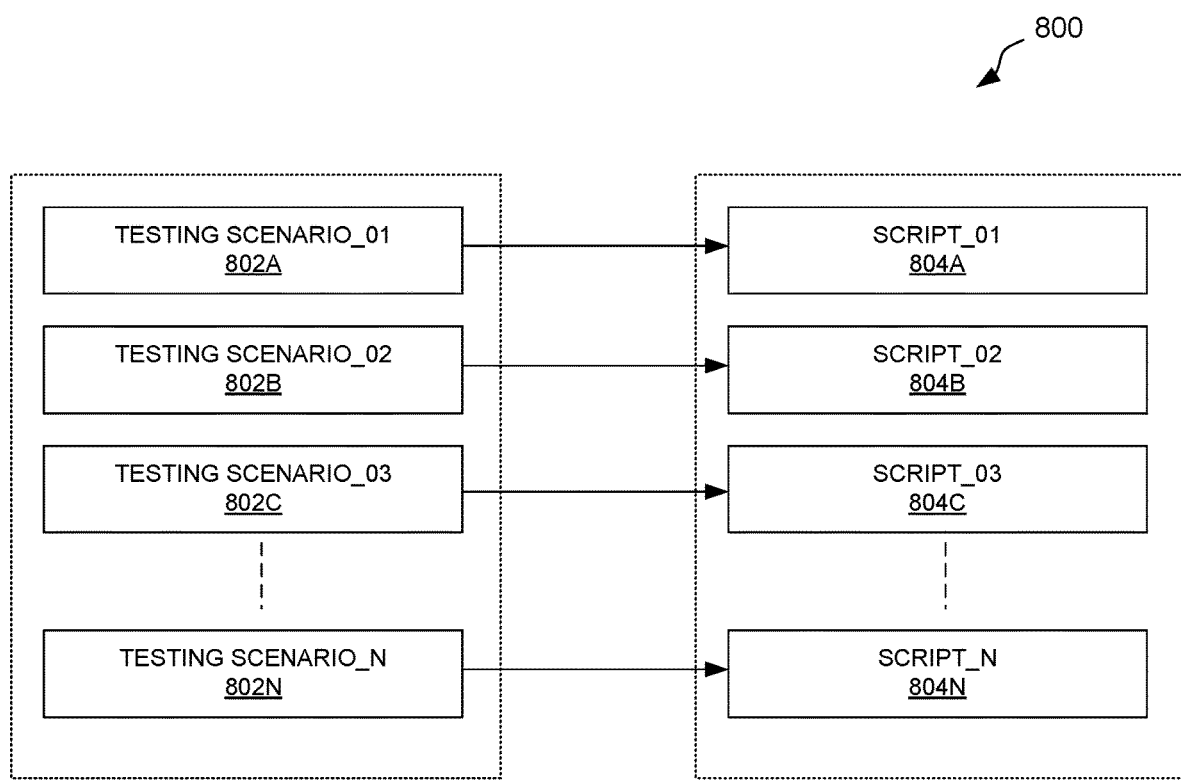
FIG. 8 shows a block diagram of a mapping of predicted tests to testing scenarios in accordance with operation 310 of FIG. 3.

FIG. 8 shows a block diagram of a mapping 800 of predicted tests to testing scenarios in accordance with operation 310 of FIG. 3. Of course, it should be noted that the present mapping 800 is just one example of the mapping resulting from operation 310 of FIG. 3.

Figure 10:
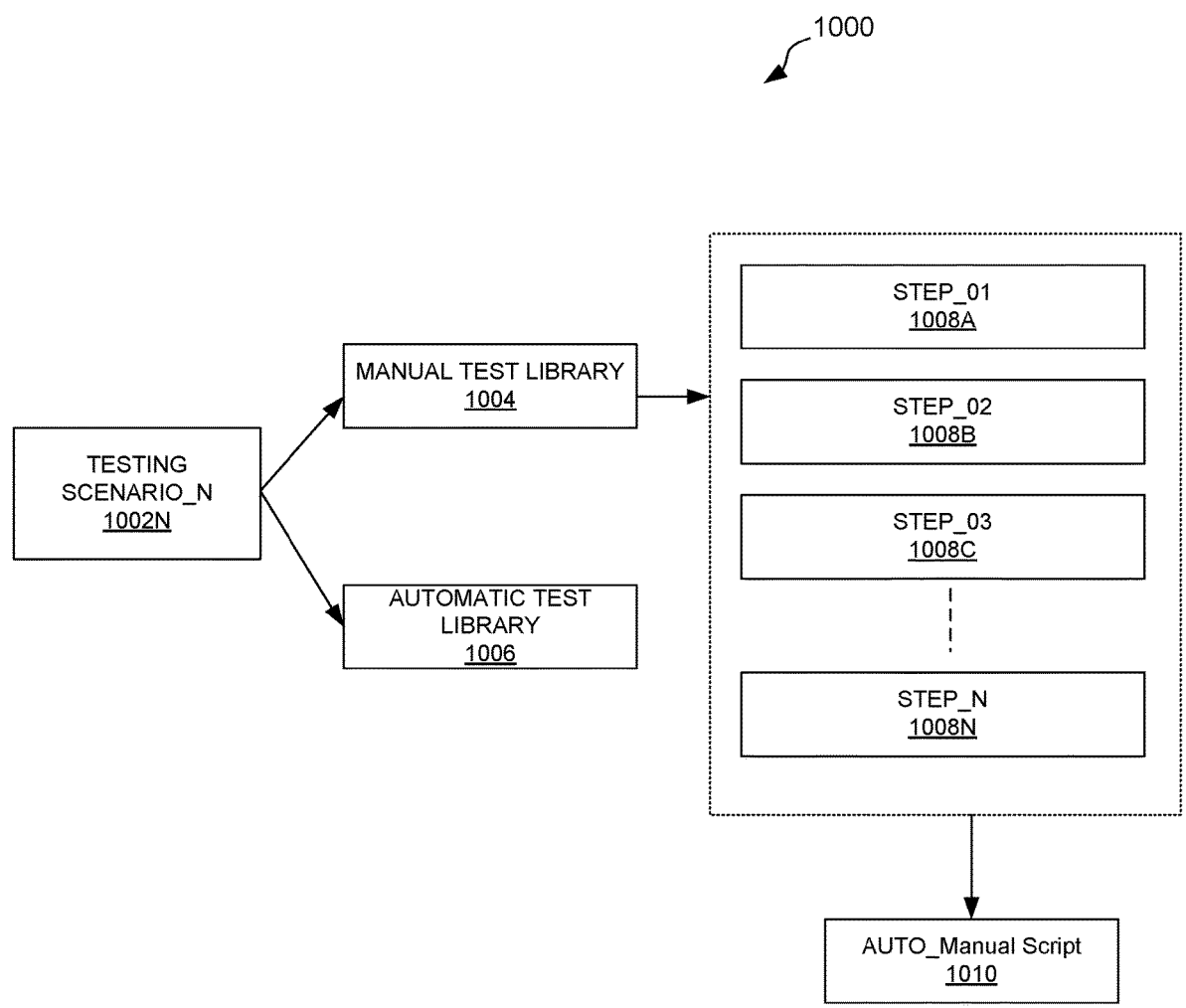
FIG. 10 shows a block diagram of a system for determining tests for testing scenarios in accordance with operation 312 of FIG. 3.

As shown, each testing scenario 802A-N is mapped to an existing script 804A-N. Of course, it is possible that one or more of the testing scenario 802A-N may be not be able to be mapped to an existing script 804A-N, such as for example when functionality of the existing script 804A-N does not correlate with functionality of the testing scenario 802A-N. FIG. 10 below will address the situation when a mapping is not identified.

Figure 9:
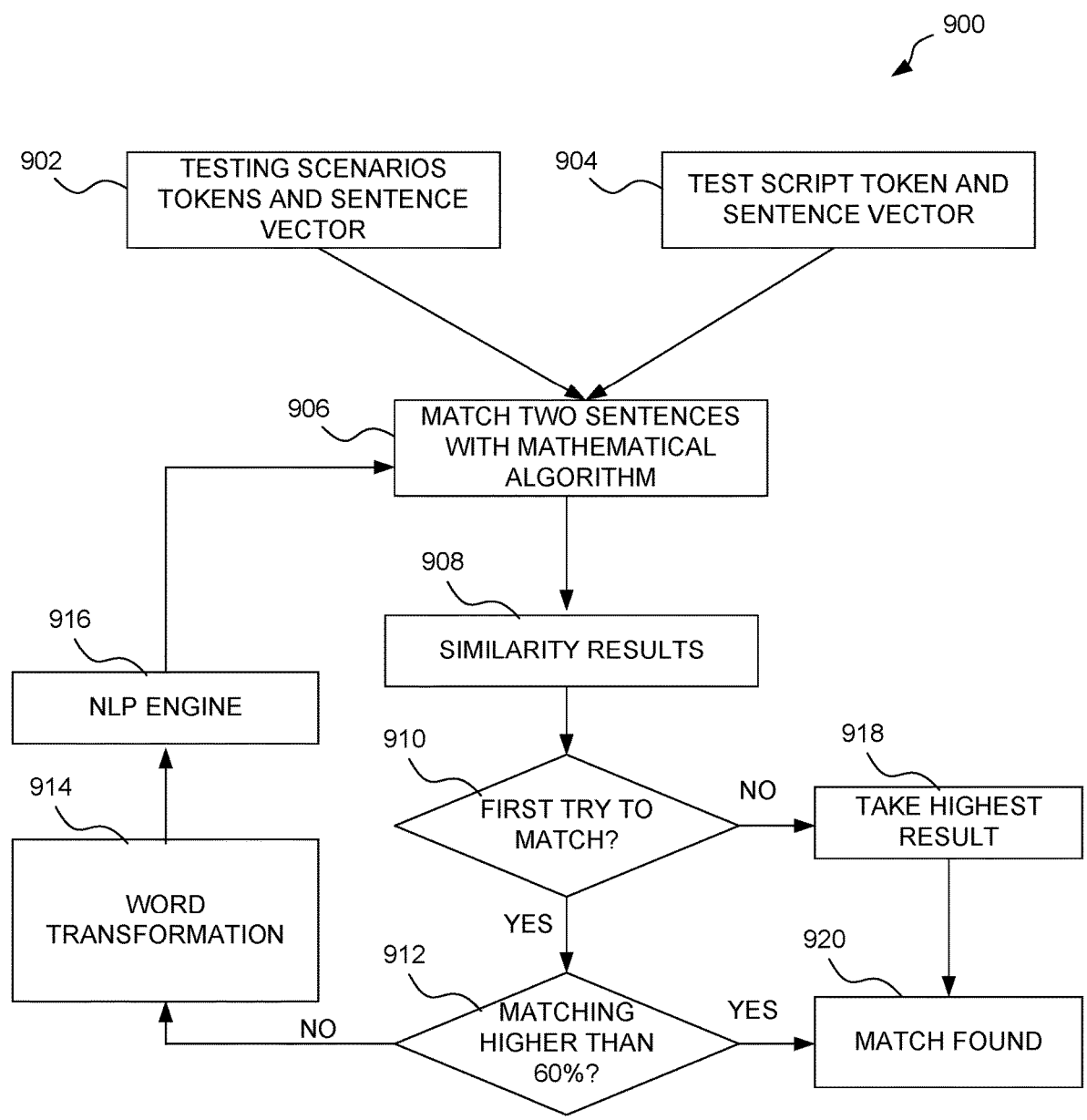
FIG. 9 shows a flow diagram of a method for mapping predicted tests to testing scenarios in accordance with operation 310 of FIG. 3.

FIG. 9 shows a flow diagram of a method 900 for mapping predicted tests to testing scenarios in accordance with operation 310 of FIG. 3. Of course, it should be noted that the present method 900 is just one example of a method that could carry out operation 310 of FIG. 3.

As shown in operation 902, tokens and sentence vectors for testing scenarios are identified. In operation 904, tokens and sentence vectors for test scripts are identified. A sentence vector for the testing scenarios is mathematically matched with a sentence vector of a test script, as shown in operation 906. Similarity results are received in operation 908.

It is determined in decision 910 whether to perform a first try to match. This may refer to using a threshold percentage to determine whether or not there is a match. When it is determined in decision 910 to perform a first try to match, it is determined in decision 912 whether the matching is higher than some percentage (e.g. 60% as shown). When it is determined in decision 912 that the matching is higher than the percentage, a match is found as shown in operation 920. Thus, the testing scenario and the test script having the match are mapped to one another.

When it is determined in decision 910 not to perform a first try to match, the highest result from the similarity results is determined in operation 918 and a match is found based on the highest result, as shown in operation 920. Thus, the testing scenario and the test script having the highest similarity result (regardless of percentage of match) are mapped to one another.

When it is determined in decision 912 that the matching is not higher than the percentage, then a word transformation is performed in operation 914. The word transformation may include identifying synonyms for the words in the tokens and sentence vectors, and then the transformed tokens and sentence vectors are sent to the NLP engine in operation 916 which inputs them back to operation 906 for mathematical matching.

In case the mapping accuracy is low (NO option for 912) this may be reflected to the machine learning model. Further, with respect to operation 914, if synonyms do not exist, the transformation may refer to external dictionaries to pull all synonyms and correct any spelling mistakes, before proceeding with repeating the mathematical correlation of operation 906.

Once there is a success in the mapping (at operation 920), two (2) activities may happen: First, a new entry should be added to the software project database—the tokens in the vector and the mapped synonym which is found; Second, a new spelling mistake/synonym that is mapped. Further, a new entry should be added to a mapping database—the vector and the mapped entities (test scenario and test script). Each mapping may have also variances, for example, the mapping may be indicated to be 90% precise and 10% deviation.

FIG. 10 shows a block diagram of a system 1000 for determining tests for testing scenarios in accordance with operation 312 of FIG. 3. Of course, it should be noted that the present system 1000 is just one example of a system that could be implemented for operation 312 of FIG. 3.

As described above, operation 310 involves mapping existing tests to testing scenarios. However, when a testing scenario does not map to an existing test, the flow of system 1000 is performed.

As shown, testing scenario_N 1002N, by way of example, does not map to an existing test. In this case, the manual test library 1004 and the automatic test library 1006 will be scanned for all related steps and cases which do not match in threshold percentage to the testing scenario but do have some percentage of similarity in the test functionality. The system 1000 will assemble a set of test steps 1008A-N for the testing scenario_N 1002N to form a new test 1010 which will be mapped to the testing scenario_N 1002N.

The manual test library 1004 and the automatic test library 1006 are each defined in very granular level (i.e. by test step/action), so a test 1010 can be assembled out of the different actions represented in the dictionaries. In this example, the libraries are scanned to find matching scripts which cover part of the functionality for the testing scenario_N 1002N and these script steps are assembled to form a new test 1010.

Figure 11:
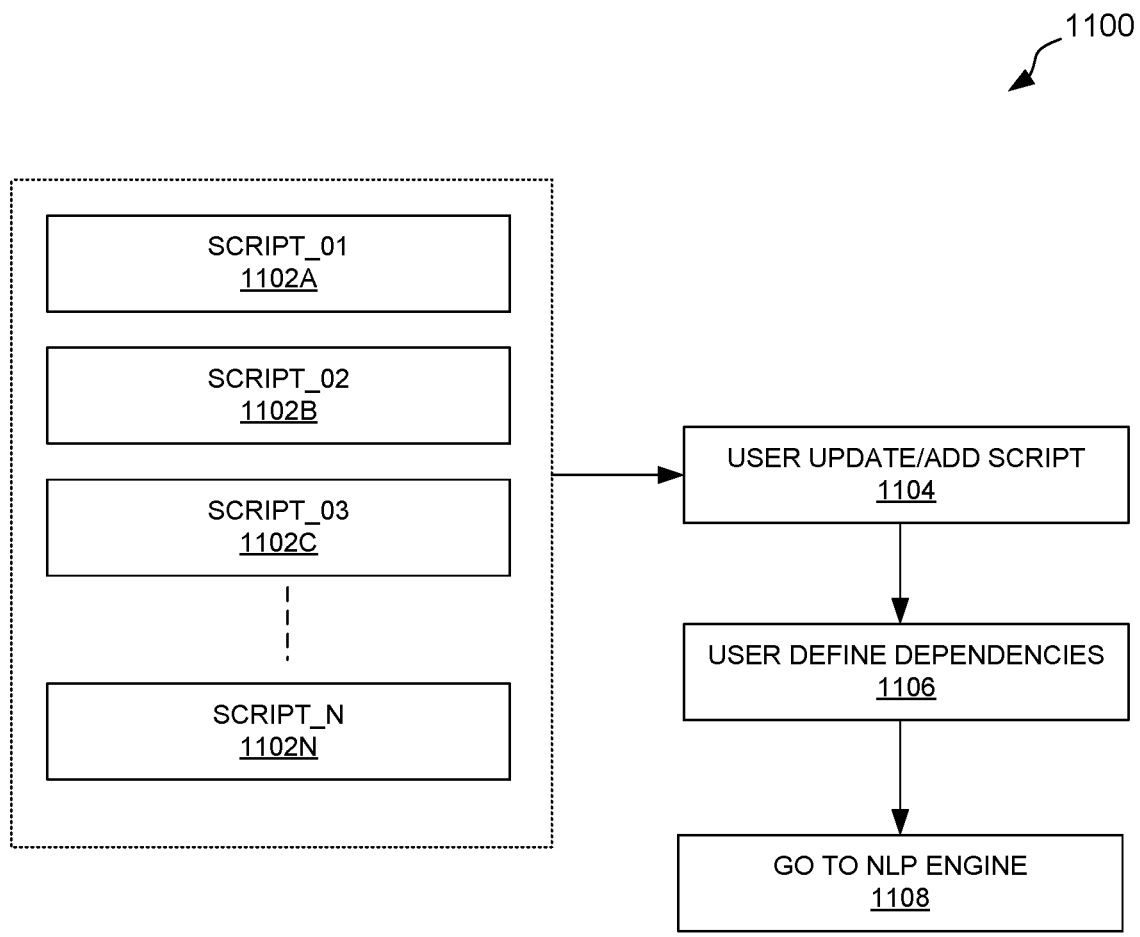
FIG. 11 shows a block diagram of a system for receiving user verification of tests in accordance with operation 316 of FIG. 3.
Figure 12:
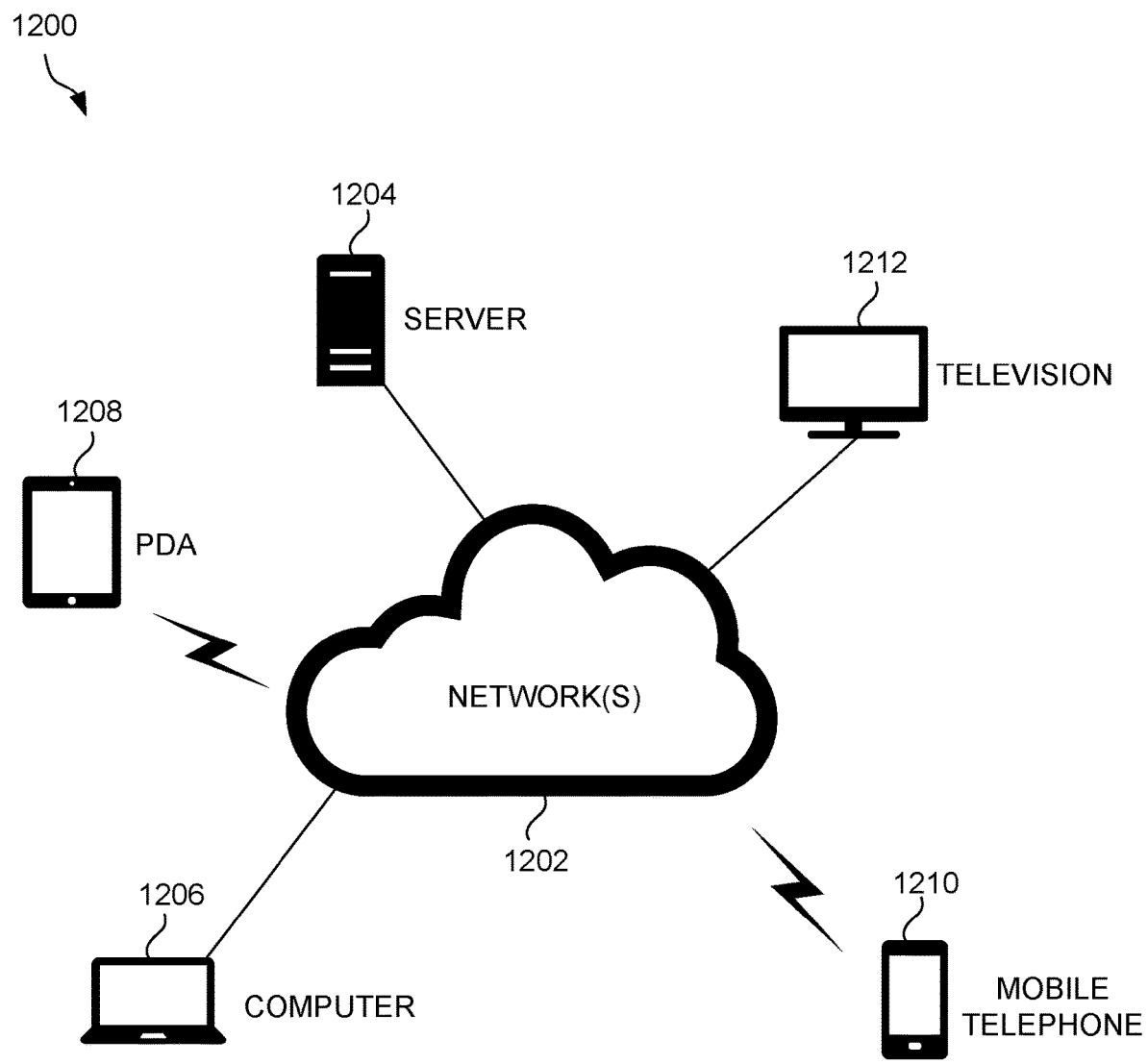
FIG. 12 illustrates a network architecture, in accordance with one possible embodiment.
Figure 13:
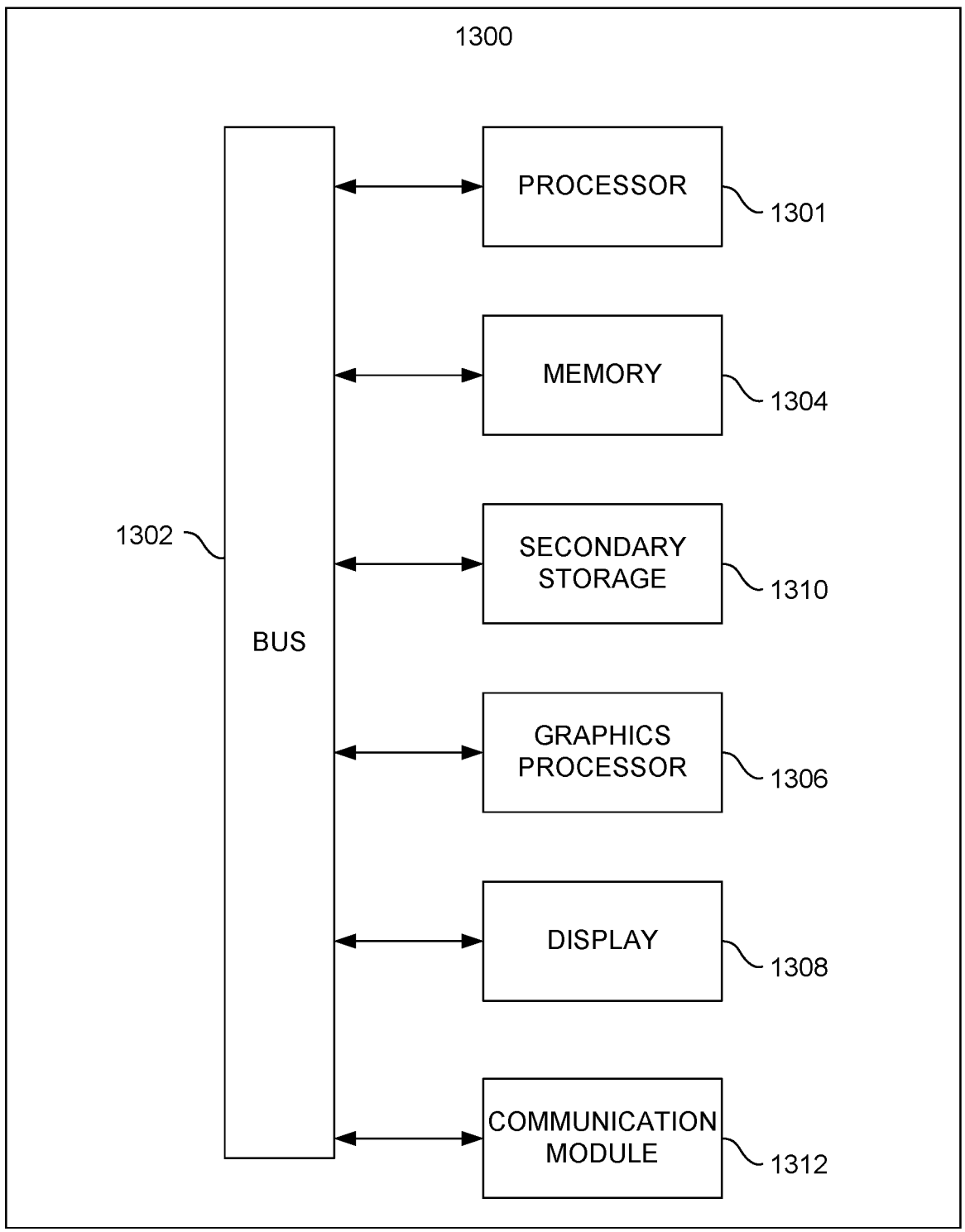
FIG. 13 illustrates an exemplary system, in accordance with one embodiment.

FIG. 11 shows a block diagram of a system 1100 for receiving user verification of tests in accordance with operation 316 of FIG. 3. Of course, it should be noted that the present system 1100 is just one example of a system that could carry out operation 316 of FIG. 3.

With respect to the present system 1100, a user is prompted with the name of a feature and all the test scripts mapped to the feature. The user verifies and marks in the system 1100 whether each of the mappings is correct or not. As shown, the user (e.g. through one or more user interfaces) updates the mappings and/or selects new scripts to be mapped the feature (see operation 1104).

For example, for a particular mapping the user can do one of the following:

1. Mark the mapping as correct—machine match from FIG. 9 was 100% correct.
2. Mark the mapping and edit—machine match from FIG. 9 was correct, but user modification is needed. In this case the user will modify the script and a new instance will be stored, so that on the next run the machine will learn and will take into consideration the modifications.
3. Mark matching as not correct. In this case the machine will learn from the mistake and untie the relationship so that on the next run the test script won't be picked up and mapped to the same set of tokens.
4. New scripts need to be created. In this case the machine will store the new scripts and will update and learn on the new mapping.

In operation 1106, the user can define dependencies between the test scripts mapped to the feature. The dependencies and any changes made in operation 1104 are provided to the NLP engine (see operation 1108).

FIG. 10 illustrates a network architecture 1000, in accordance with one possible embodiment. As shown, at least one network 1002 is provided. In the context of the present network architecture 1000, the network 1002 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 1002 may be provided.

Coupled to the network 1002 is a plurality of devices. For example, a server computer 1004 and an end user computer 1006 may be coupled to the network 1002 for communication purposes. Such end user computer 1006 may include a desktop computer, lap-top computer, and/or any other type of logic. Still yet, various other devices may be coupled to the network 1002 including a personal digital assistant (PDA) device 1008, a mobile phone device 1010, a television 1012, etc.

FIG. 11 illustrates an exemplary system 1100, in accordance with one embodiment. As an option, the system 1100 may be implemented in the context of any of the devices of the network architecture 1000 of FIG. 10. Of course, the system 1100 may be implemented in any desired environment.

As shown, a system 1100 is provided including at least one central processor 1101 which is connected to a communication bus 1102. The system 1100 also includes main memory 1104 [e.g. random access memory (RAM), etc.]. The system 1100 also includes a graphics processor 1106 and a display 1108.

The system 1100 may also include a secondary storage 1110. The secondary storage 1110 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 1104, the secondary storage 1110, and/or any other memory, for that matter. Such computer programs, when executed, enable the system 1100 to perform various functions (as set forth above, for example). Memory 1104, storage 1110 and/or any other storage are possible examples of non-transitory computer-readable media.

The system 1100 may also include one or more communication modules 1112. The communication module 1112 may be operable to facilitate communication between the system 1100 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer readable medium storing computer code executable by a processor to perform a method comprising:
   providing an interface to a plurality of different testing tools, each testing tool of the plurality of different testing tools usable for performing one or more testing-related tasks;
   retrieving information describing a software project, wherein the information is retrieved from the plurality of different testing tools and wherein the information includes business requirements, features, user stories, diagrams, worksheets, and text;
   analyzing the information describing the software project, at least in part using natural language processing, to retrieve tokens from the information that each represent one of a plurality of different functionalities of the software project;
   generating a plurality of testing scenarios for each functionality of the plurality of different functionalities of the software project by:
      retrieving, from at least one test step dictionary, a plurality of test steps mapped to the token representing the functionality and a plurality of parameters mapped to the token representing the functionality,
      generating a first subset of the plurality of testing scenarios for the functionality using the plurality of test steps,
      generating a second subset of the plurality of testing scenarios for the functionality using the plurality of parameters, and
      removing duplicate testing scenarios from the first subset and the second subset;
   predicting a plurality of tests for the software project by:
      inputting the plurality of different functionalities of the software project to at least one machine learning model,
      wherein the machine learning model processes the plurality of different functionalities to predict the plurality of tests for the software project, the plurality of tests including regression tests, progression tests, and tests based on defect analysis;
   mapping the plurality of tests predicted for the software project to the plurality of testing scenarios generated for each functionality of the plurality of different functionalities of the software project by:
      for each test of the plurality of tests, building a test string from data associated with the test,
      for each testing scenario of the plurality of testing scenarios, building a testing scenario string from data associated with the testing scenario, and
      matching the test strings to the testing scenario strings to map the plurality of tests to the plurality of testing scenarios:
   for any remaining testing scenario of the plurality of testing scenarios not mapped to any test of the plurality of tests, generating a new test for the remaining testing scenario by:
      identifying one or more tests of the plurality of tests having a partial match to the remaining testing scenario, assembling test steps from the one or more tests to generate the new test for the remaining testing scenario, and mapping the new test to the remaining testing scenario;

orchestrating use of the plurality of different testing tools to execute the plurality of tests mapped to the plurality of testing scenarios and any new tests mapped to the plurality of testing scenarios.

2. The non-transitory computer readable medium of claim 1, wherein the method is performed by an orchestration platform.

3. The non-transitory computer readable medium of claim 2, wherein the orchestration platform is independent of the plurality of different testing tools.

4. The non-transitory computer readable medium of claim 1, wherein the plurality of different testing tools are independently managed on different platforms.

5. The non-transitory computer readable medium of claim 1, wherein the interface includes application programming interfaces (APIs) to communicate with the plurality of different testing tools.

6. The non-transitory computer readable medium of claim 1, wherein the testing-related tasks include tasks for designing and executing one or more tests for the software project.

7. The non-transitory computer readable medium of claim 1, wherein the testing-related tasks include analyzing results of test script executions.

8. The non-transitory computer readable medium of claim 1, wherein the testing-related tasks include detecting defects in the software project.

9. The non-transitory computer readable medium of claim 1, wherein orchestrating use of the plurality of different testing tools to execute the plurality of tests mapped to the plurality of testing scenarios and any new tests mapped to the plurality of testing scenarios includes:

preparing an execution file that manages dependencies between the plurality of tests mapped to the plurality of testing scenarios and any new tests mapped to the plurality of testing scenarios.

10. The non-transitory computer readable medium of claim 1, wherein matching the test strings to the testing scenario strings to map the plurality of tests to the plurality of testing scenarios includes:

identifying one of the test strings and one of the testing scenario strings having higher than a threshold level of matching, and mapping the test corresponding to the one of the test strings with the testing scenario corresponding to the one of the testing scenario strings.

11. The non-transitory computer readable medium of claim 10, wherein identifying one or more tests of the plurality of tests having a partial match to the remaining testing scenario includes identifying one or more of the test strings having less than the threshold level of matching to the testing scenario string of the remaining testing scenario.

12. A method, comprising:

providing an interface to a plurality of different testing tools, each testing tool of the plurality of different testing tools usable for performing one or more testing-related tasks;

retrieving information describing a software project, wherein the information is retrieved from the plurality of different testing tools and wherein the information includes business requirements, features, user stories, diagrams, worksheets, and text;

analyzing the information describing the software project, at least in part using natural language processing, to retrieve tokens from the information that each represent one of a plurality of different functionalities of the software project;

generating a plurality of testing scenarios for each functionality of the plurality of different functionalities of the software project by:

retrieving, from at least one test step dictionary, a plurality of test steps mapped to the token representing the functionality and a plurality of parameters mapped to the token representing the functionality, generating a first subset of the plurality of testing scenarios for the functionality using the plurality of test steps, generating a second subset of the plurality of testing scenarios for the functionality using the plurality of parameters, and removing duplicate testing scenarios from the first subset and the second subset;

predicting a plurality of tests for the software project by:

inputting the plurality of different functionalities of the software project to at least one machine learning model, wherein the machine learning model processes the plurality of different functionalities to predict the plurality of tests for the software project, the plurality of tests including regression tests, progression tests, and tests based on defect analysis;

mapping the plurality of tests predicted for the software project to the plurality of testing scenarios generated for each functionality of the plurality of different functionalities of the software project by:

for each test of the plurality of tests, building a test string from data associated with the test, for each testing scenario of the plurality of testing scenarios, building a testing scenario string from data associated with the testing scenario, and matching the test strings to the testing scenario strings to map the plurality of tests to the plurality of testing scenarios:

for any remaining testing scenario of the plurality of testing scenarios not mapped to any test of the plurality of tests, generating a new test for the remaining testing scenario by:

identifying one or more tests of the plurality of tests having a partial match to the remaining testing scenario, assembling test steps from the one or more tests to generate the new test for the remaining testing scenario, and mapping the new test to the remaining testing scenario:

orchestrating use of the plurality of different testing tools to execute the plurality of tests mapped to the plurality of testing scenarios and any new tests mapped to the plurality of testing scenarios.

13. A system, comprising:

a non-transitory memory storing instructions; and one or more processors in communication with the non-transitory memory that execute the instructions to perform a method comprising:

providing an interface to a plurality of different testing tools, each testing tool of the plurality of different testing tools usable for performing one or more testing-related tasks;

retrieving information describing a software project, wherein the information is retrieved from the plurality of different testing tools and wherein the information includes business requirements, features, user stories, diagrams, worksheets, and text;

analyzing the information describing the software project, at least in part using natural language processing, to retrieve tokens from the information that each represent one of a plurality of different functionalities of the software project;

generating a plurality of testing scenarios for each functionality of the plurality of different functionalities of the software project by:
   retrieving, from at least one test step dictionary, a plurality of test steps mapped to the token representing the functionality and a plurality of parameters mapped to the token representing the functionality,
   generating a first subset of the plurality of testing scenarios for the functionality using the plurality of test steps,
   generating a second subset of the plurality of testing scenarios for the functionality using the plurality of parameters, and
   removing duplicate testing scenarios from the first subset and the second subset;

predicting a plurality of tests for the software project by:
   inputting the plurality of different functionalities of the software project to at least one machine learning model,
   wherein the machine learning model processes the plurality of different functionalities to predict the plurality of tests for the software project, the plurality of tests including regression tests, progression tests, and tests based on defect analysis;

mapping the plurality of tests predicted for the software project to the plurality of testing scenarios generated for each functionality of the plurality of different functionalities of the software project by:
   for each test of the plurality of tests, building a test string from data associated with the test,
   for each testing scenario of the plurality of testing scenarios, building a testing scenario string from data associated with the testing scenario, and
   matching the test strings to the testing scenario strings to map the plurality of tests to the plurality of testing scenarios:

for any remaining testing scenario of the plurality of testing scenarios not mapped to any test of the plurality of tests, generating a new test for the remaining testing scenario by:
   identifying one or more tests of the plurality of tests having a partial match to the remaining testing scenario,
   assembling test steps from the one or more tests to generate the new test for the remaining testing scenario, and
   mapping the new test to the remaining testing scenario:

orchestrating use of the plurality of different testing tools to execute the plurality of tests mapped to the plurality of testing scenarios and any new tests mapped to the plurality of testing scenarios.

\* \* \* \* \*